United States Patent
Sorace et al.

(10) Patent No.: US 6,477,597 B1
(45) Date of Patent: Nov. 5, 2002

(54) LOCK ARCHITECTURE FOR LARGE SCALE SYSTEM

(75) Inventors: Jean-Dominique Sorace, Lancey (FR); Nasr-Eddine Walehiane, Eybens (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/411,231

(22) Filed: Oct. 4, 1999

(30) Foreign Application Priority Data

Oct. 9, 1998 (FR) .............................. 98 12651

(51) Int. Cl.$^7$ .......................... G06F 12/00; G06F 13/14

(52) U.S. Cl. ...................... 710/200; 710/220; 710/240

(58) Field of Search ............................... 710/200, 220, 710/240, 241, 242, 243, 244, 107, 108, 109, 110, 111, 112, 113, 114, 115, 116, 117, 119, 120, 124

(56) References Cited

U.S. PATENT DOCUMENTS

| | | | |
|---|---|---|---|
| 4,435,766 A | | 3/1984 | Haber et al. |
| 4,574,350 A | | 3/1986 | Starr |
| 5,261,108 A | | 11/1993 | Hayashi et al. |
| 5,548,728 A | * | 8/1996 | Danknick .................... 710/260 |
| 5,983,015 A | * | 11/1999 | Lee et al. .................... 709/107 |
| 6,178,481 B1 | * | 1/2001 | Krueger et al. ............. 711/122 |

FOREIGN PATENT DOCUMENTS

WO   WO 98 33119 A   7/1998

OTHER PUBLICATIONS

"Fast Lock", IBM Technical Disclosure Bulletin, vol. 31, No. 11, Apr. 1, 1989, pp. 136–141, XP000284976—entire document.

* cited by examiner

*Primary Examiner*—Peter Wong
*Assistant Examiner*—Tim Vo
(74) *Attorney, Agent, or Firm*—Miles & Stockbridge P.C.; Edward J. Kondracki

(57) ABSTRACT

The lock architecture for a computer system comprises several processors (10, 11, 12, 13) such that each processor (10) requesting a resource of the system takes control of said resource if a first lock state indicates that said resource is free. The requesting processor is placed on active standby if a second lock state indicates that said resource is busy. A lock includes a first and second lock state. The first lock state corresponds to a null value, and the second lock state corresponds to a non-null value. The lock is associated with a data structure that comprises:

- a counter that indicates a number of processors (10, 11, 12, 13) that have requested said resource without having used it and then released it;
- a first data item specific to said processor (10) switched from a first value to a second value by said processor (10) detecting the second lock state;
- at least one second data item specific to another processor (11, 12, 13), switched from a first value to a second value by said other processor (11, 12, 13) detecting the second lock state;
- so that the second value of the first data item places said processor (10) on active standby until the first data item is set to the first value by said other processor (11, 21, 13) releasing said resource,
- so that said processor (10), having used said resource, sets the second data item to the first value if it detects that the second lock state exists after the release of said resource.

9 Claims, 3 Drawing Sheets

LOCK ARCHITECTURE FOR LARGE SCALE SYSTEM

FIELD OF THE INVENTION

The field of the invention is that of the allocation of the shared resources of a computer system to processes in such a way that a process can have exclusive allocation of a resource.

DESCRIPTION OF RELATED ART

In the prior art, a simple means is known that consists of placing a lock on a resource. An unlocked state of the lock allows the resource to be allocated to a process. A locked state prevents the resource from being allocated to the process. When a process needs to be allocated a resource, it accesses the state of this resource's lock by means of an atomic operation. An operation is considered atomic if the state of the lock cannot be modified by any other process between the start and the end of the operation. The atomic operation essentially consists of reading the state of the lock and setting it to the locked state. If at the start of operation, the state of the lock is unlocked, the resource can be allocated to the process in question. The locked state at the end of operation guarantees the exclusivity of the allocation to the process. In effect, another process performing an atomic operation on this lock reads a locked state at the start of operation, which prevents this resource from being allocated to it. The other process is then placed on standby until the resource is available, reiterating its atomic operation until it detects an unlocked state of the lock. The process in question returns the lock to the unlocked state when it no longer needs the resource.

This simple means is not entirely satisfactory for a large number of processes run in parallel in a large number of processors. In fact, if several processes need the same resource, the resource can only be allocated to one process, which has detected an unlocked state of the associated lock by means of its atomic operation. The moment the process holding the lock returns it to the unlocked state, a considerable number of processes run the risk of initiating atomic operations that have the consequence of occupying the system bus in an untimely way. The lock is generally resident in memory. In the case of a non-uniform access memory, the problem is amplified. A non-uniform access memory is a memory for which the access time varies as a function of the location of the processors relative to the location of the memory. It is noted that the atomic operations that have a shorter access time to the lock are privileged as compared to atomic operations that do not benefit from the shorter access time. This has a negative effect on the equitable allocation of the resource to the processes. In particular, the processes that benefit from a short access time run the risk of monopolizing the resource. Furthermore, the location of the valid state of the lock runs the risk of migrating uncontrollably within the memory.

One known solution consists of assigning a resource a token that can only be held by one process at any given time. When the process holding the token no longer needs the resource, it passes the token to one of the processes waiting for this resource. The problem is that of knowing what the process holding the token does if there is no process waiting for the resource. This requires independent management of the available tokens, which does not encourage simplicity.

SUMMARY OF THE INVENTION

The object of the invention is to provide a simple solution that eliminates the above-mentioned drawbacks of the prior art. The invention relates to a lock architecture for a computer system comprising several processors, such that each processor requesting a resource of the system takes control of said resource if a first lock state indicates that said resource is available and is placed on active standby if a second lock state indicates that said resource is busy. The architecture is characterized in that a lock is associated with a data structure that comprises:

a counter that indicates a number of processors that have requested said resource without having used it and then released it, the first lock state corresponding to a null value, the second lock state corresponding to a non-null value;

a first data item specific to said processor, switched from a first value to a second value by said processor detecting the second lock state;

at least one second data item specific to another processor, switched from a first value to a second value by said other processor detecting the second lock state;

so that the second value of the first data item places said processor on active standby until the first data item is set to the first value by said other processor releasing said resource, so that said processor, having used said resource, sets the second data item to the first value if it detects that the second lock state exists after the release of said resource.

One notable advantage of the invention over the above-mentioned prior art is that a process seeking to be allocated a resource performs only one access to the counter at the instant it requests the resource. If the resource is available, the counter has the same effect as a conventional lock. If the resource is busy, the allocation of the resource is authorized on the initiative of the process that holds it. This has the effect of reducing the transactions in the system bus and making it possible to control the allocations of resources to the processes.

BRIEF DESCRIPTION OF THE DRAWINGS

A preferred exemplary implementation of the invention is taught in the following description in reference to the figures, in which.

DESCRIPTION OF THE PREFERRED EMBODIMENTS

Figure 1:
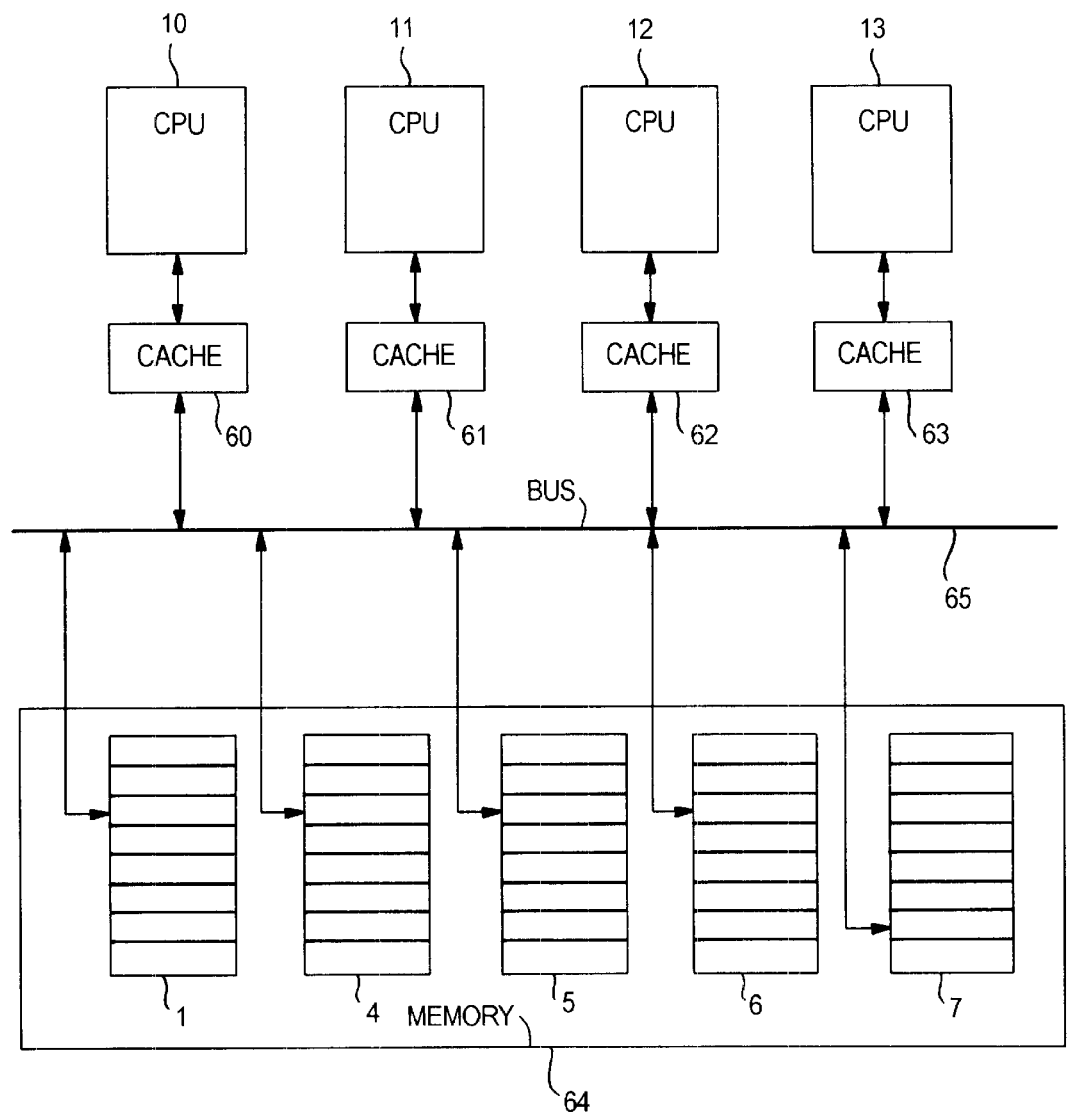
FIG. 1 represents a lock architecture for a multiprocessor system.

In reference to FIG. 1, a computer system comprises several processors 10, 11, 12, 13, of the central processing unit type CPU and an addressable memory 64 accessible by the processors through a system bus 65. Each of the processors 10, 11, 12, 13, has in a respective cache memory 60, 61, 62, 63 a copy of the data of the memory 64 that it processes. A known caching mechanism prevents the processor from sending an access request through the bus 65 if it has an up-to-date copy in its cache memory of the data it processes.

In the memory 64, a table 1 is constituted by rows, each of which comprises a counter associated with a sharable resource of the system. Each row of the table 1 is accessible by the processors 10, 11, 12, 13 of the system by means of an indexed addressing mechanism. The indexed addressing mechanism consists, in a known way, of assigning each row a row number that is added to a table start address in order to obtain an absolute row number. Thus, the row numbers remain unchanged no matter what the physical location of the table 1, of which only the table start address is a function.

In the memory 64, a table 4 is constituted by rows, each of which contains a data item specific to the processor 10. A table 5 is constituted by rows, each of which contains a data item specific to the processor 11. A table 6 is constituted by rows, each of which contains a data item specific to the processor 12. A table 7 is constituted by rows, each of which contains a data item specific to the processor 13.

Each row of the tables 4 through 7 is accessible by the processors 10, 11, 12, 13 of the system by means of an indexed addressing mechanism identical to that of table 1.

The counter contained in a row of the table 1 and the data contained in each row of the tables 4, 5, 6, 7 with a row number identical to that of the table 1 constitute a data structure associated with a lock wherein a first state indicates that a resource identified by this row number is available. A second lock state indicates that this resource is busy.

A null value of the counter indicates that no processor 10, 11, 12, 13 has requested the resource, or that any processor having requested the resource has used it and released it. This null value corresponds to the first lock state. Each request for the resource by a processor 10, 11, 12, 13 increments the counter. Each release of the resource by a processor 10, 11, 12, 13 that has used it decrements the counter. Thus, the counter indicates a number of processors that have requested the resource, including a processor 10 that has used it but has not released it.

Considering the data item contained in the row of the table 4 with a number identical to that of the table 1, a first value indicates that the processor 10 has not requested the resource indexed by this row number or that, if the processor 10 has requested this resource, it can take control of it. A second value indicates that the processor 10 has requested the resource indexed by this row number and that it has detected the second lock state, which prevents it from taking control of the resource. The processor 10 is then placed on active standby, which consists of reading its specific data item until the latter is set to its first value by another processor 11, 12, 13 that releases the resource.

Considering the data item contained in the row of the table 5 with a number identical to that of the table 1, a first value indicates that the processor 11 has not requested the resource indexed by this row number or that, if the processor 11 has requested this resource, it can take control of it. A second value indicates that the processor 11 has requested the resource indexed by this row number and that it has detected the second lock state, which prevents it from taking control of the resource. The processor 11 is then set on active standby, which consists of reading its specific data item until the latter is set to the first value by another processor 10, 12, 13 that releases the resource.

Considering the data item contained in the row of the table 6 with a number identical to that of the table 1, a first value indicates that the processor 12 has not requested the resource indexed by this row number or that, if the processor 12 has requested this resource, it can take control of it. A second value indicates that the processor 12 has requested the resource indexed by this row number and that it has detected the second lock state, which prevents it from taking control of the resource. The processor 12 is therefore placed on active standby, which consists of reading its specific data item until the latter is set to its first value by another processor 11, 10, 13 that releases the resource.

Considering the data item contained in the row of the table 7 with a number identical to that of the table 1, a first value indicates that the processor 13 has not requested the resource indexed by this row number or that, if the processor 13 has requested this resource, it can take control of it. A second value indicates that the processor 13 has requested the resource indexed by this row number and that it has detected the second lock state, which prevents it from taking control of the resource. The processor 13 is therefore placed on active standby, which consists of reading its specific data item until the latter is set to its first value by another processor 11, 12, 10 that releases the resource.

It is noted that for each row number of the table 1, the content of the counter is an image of the number of tables 4, 5, 6, 7 comprising, in the row number identical to the row number of the table 1, a data item at its second value. In this case, the number of tables is one unit lower than the content of the counter.

The set of tables 1, 4, 5, 6, 7 constitutes a data structure associated with the locks of a set of resources indexed by the row numbers of these tables.

Figure 2:
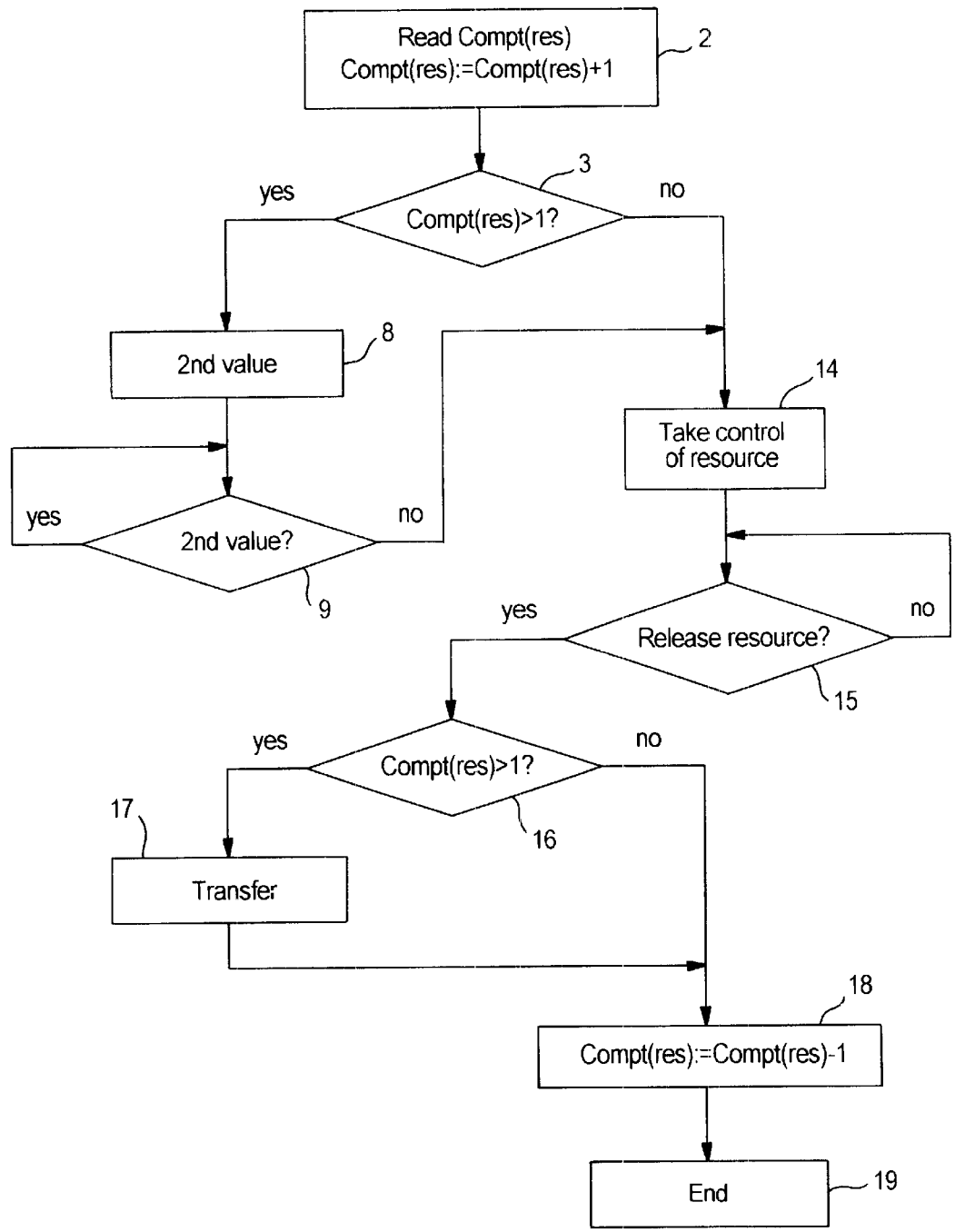
FIG. 2 describes a process for exclusively allocating a resource to each processor that requests it.

FIG. 2 describes a process executed by each processor for requesting a resource in the computer system.

Each processor 10, 11, 12, 13 that requests exclusive use of a resource (res) executes an atomic operation 2. The resource (res) corresponds to a row number of the table 1 that contains the counter associated with this resource. The atomic operation consists of reading and changing the value compt(res) of the counter without another processor's being able to access the counter between the reading and the changing of the value. The reading of the counter takes place at an absolute address that is the sum of the absolute start address of the table 1 and the row number. In this case, the value change of the counter is an incrementation.

The atomic operation 2 is followed by a test 3 on the value of the counter. A null value of the counter before incrementation indicates that the resource (res) was available. In this case, after the operation 2, the value compt(res) is not strictly greater than one, and the processor takes control of the resource in step 14 until it receives an order to release the resource. The reception of this order, controlled by a test 15, triggers a test 16.

A non-null value of the counter before incrementation indicates that the resource (res) was not available. In this case, after the operation 2, the value compt(res) is strictly greater than one. In step 8, the processor sets its specific data item, contained in the row of the table 4, 5, 6, 7 with the number corresponding to the resource, to its second value. The processor is placed on active standby until its specific data item returns to its first value by means of a test 9 that loops as long as its specific data item is at its second value. As will be seen below, the specific data item is returned to its first value by a step 17 of an identical instruction stream executed by another processor that is holding the resource. When the specific data item is returned to its first value, a negative result of the test 9 triggers the step 14, which continues as explained in the preceding paragraph.

The test 16 verifies the value Compt(res) associated with the resource (res). A value Compt(res) greater than one indicates that at least one other processor is waiting for the resource (res). The value of Compt(res) may have been incremented by more than one, before or after the triggering of the step 14, by another processor that has executed the operation 2. If another processor is waiting for the resource (res), the result of the test 16 triggers the step 17 for transferring the availability of the resource to another such processor and an atomic operation 18. If no other processor is waiting for the resource, the processor that releases the resource executes the atomic operation 18 directly.

The step 17 essentially consists of a call to a function for transferring to another processor in accordance with a given strategy.

For example, a first strategy consists of transferring the availability of a resource to another processor in round Robin fashion. The processor 11 that releases the resource consults the table 6 of the processor 12 whose processor identification number PID directly follows the number PID of the processor that is releasing the resource. The processor 11 reads the data item contained in the row of the table 6 whose number corresponds to the released resource. If the data item is at its second value, waiting for the resource, the processor 11 sets the content of the row to the first value, which will be interpreted by the processor 12 as a resource availability so as to trigger the step 14 of its instruction stream. If the data item is at its first value, not waiting for the resource, the processor 11 consults the table 7 of the processor 13 whose processor identification number PID directly follows the number PID of the processor that is not waiting for the resource. The actions explained above are repeated until a data item at its second value is read, possibly until the consultation of the table 4 of the processor 10 whose processor identification number PID directly precedes the number PID of the processor that is releasing the resource. The preceding explanations in reference to the processor 11 are valid for any processor 10, 12, 13. This first strategy guarantees that there will be no starvation, which means that each processor will have access to the resource since the consultation is circular.

By way of example, a second strategy consists of transferring the availability of the resource to another processor that is the first to have requested the resource after the processor that is releasing it. In order to implement the second strategy, the first data item value is a null value and the second specific data item value is a date at which the processor executes the atomic operation 2. This date is obtained by the processor that executes the atomic operation 2, in a date register TBR incremented in a known way by means of a timer. The processor that releases the resource sets a data item to zero, which is the lowest non-null date value among the waiting processors.

It is interesting to note that to implement the process, a processor 10, 20, 30, only needs to know a row number corresponding to the requested resource, identical for each of the tables 1, 4, 5, 6, 7, and the start address of each of the tables 1, 4, 5, 6, 7. The processor 10, 11, 12, 13 that is requesting a resource performs at most two accesses to the table 1 using the atomic operations 2 and 18 for this resource. The processor 10, 11, 12, 13 that is placed on active standby for a resource by means of the test 9 is the only one to intensively consult the table 4, 5, 6, 7 that is specific to it. The processor 10, 11, 12, 13 that is releasing a resource performs at most one access to each of the tables 4, 5, 6, 7 in step 17. The architecture described considerably minimizes contention in the bus at the release of a resource, which involves only two processors at most, the one that is releasing the resource and possibly the one to which the resource is allocated. Thus, it is not necessary to maintain a waiting list.

The processor 10 that performs the atomic operation 2 performs a first access to the bus 65 in order to have a copy of the counter available in its cache memory 60 and a second access to the bus 65 for the test 16 if its copy of the counter in the cache memory 60 is not up-to-date. In the best of cases in which no other processor is requesting the resource, only one bus access is enough. If the lock is in its second state, the processor 10 performs a third access to the bus 65 in step 8 in order to have a copy of its specific data item available in its cache memory 60, which it sets to its second value. The active standby of the processor 10 does not require any new access to the bus 65 as long as its copy in the cache memory 60 remains at its second value. The moment its specific data item is set to its first value, its copy in cache memory is automatically updated by the cache coherency protocol. In step 17, the processor 10 performs a finite number of fourth accesses to the bus 65, limited by the number of processors of the system, until it determines a distinct processor in order to set the specific data item of the distinct processor to its first value. The number of accesses to the bus 65 for requesting and releasing a resource is therefore kept to a finite number. This offers an advantage over a conventional lock architecture, in which an active standby of a processor until it takes control of a resource can generate an indeterminate number of bus accesses for consulting the states of the lock.

The preceding explanations for the processor 10 with its cache memory 60 remain valid for each of the processors 11, 12, 13, with its respective cache memory 61, 62, 63.

The architecture and process just described are advantageous in an environment of the SMP, UMA or NUMA type or of the distributed type.

The SMP type environment is an environment in which the behavior of the processors toward the resources is identical, seen from the operating system. Access to the memory is uniform (UMA for uniform access memory) when the access time to the memory is independent of the physical location of the processors. Access to the memory is non-uniform (NUMA for non-uniform memory access) when the access time to the memory depends on the physical location of the processors.

In the SMP, UMA or NUMA environment, the best part of the architecture described is obtained by allocating each processor a lock table of the same type as the tables 4, 5, 6, 7. It is also possible to allocate a table to a given group of processors. In this case, the behavior of the processors in the group is identical to that of a conventional lock architecture. However, the group of processors benefits from the architecture described in connection with the other processors of the system.

Figure 3:
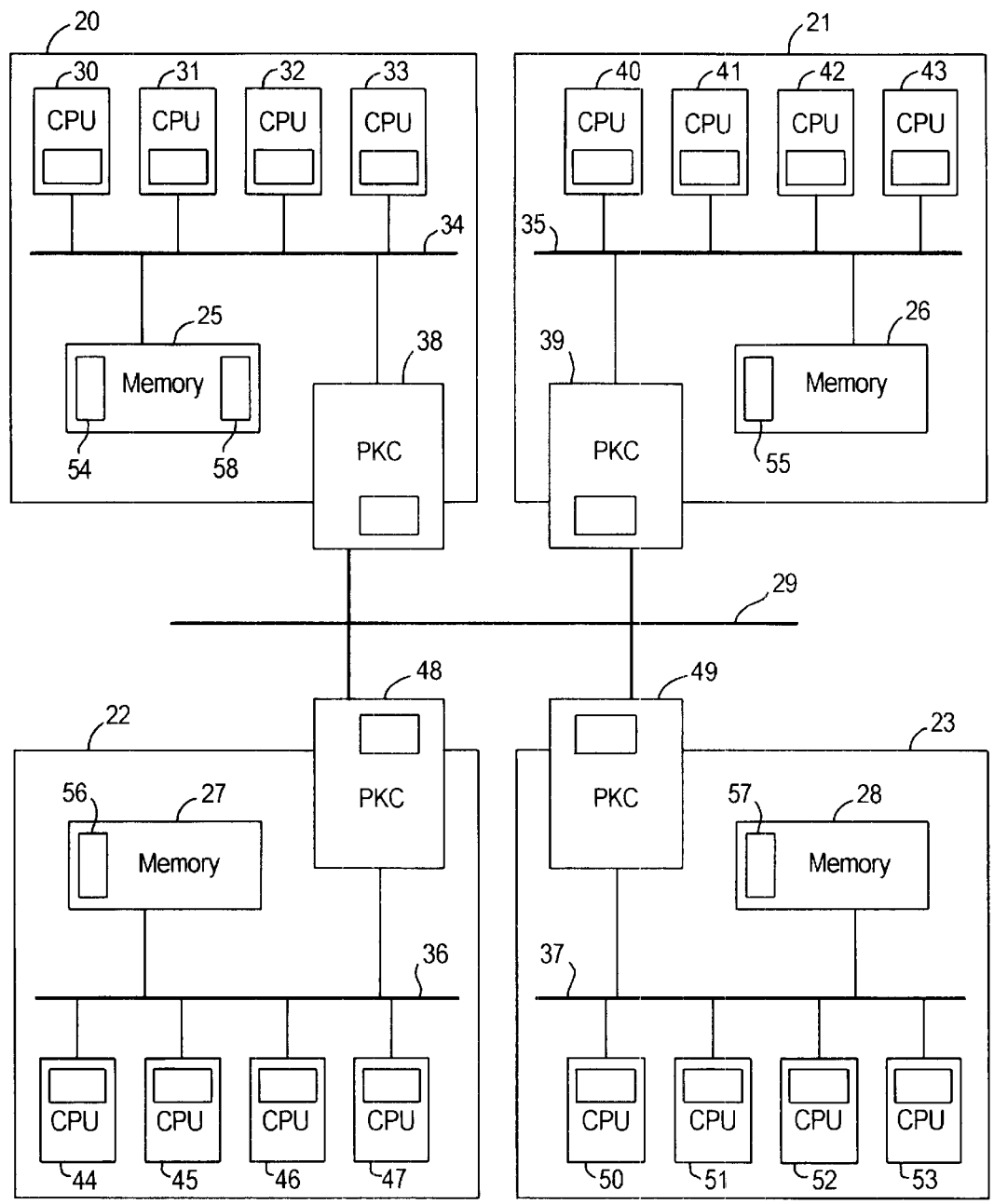
FIG. 3 represents an environment with a non-uniform access memory.

For example, in reference to FIG. 3, a large scale system comprising modules 20, 21, 22, 23 connected by information exchange means 29, 38, 39, 48, 49 constitutes a NUMA environment implemented by a common operating system OS. The module 20 comprises one or more processors 30, 31, 32, 33 and a storage unit 25 accessed by means of a bus 34. The module 21 comprises one or more processors 40, 41, 42, 43 and a storage unit 26 accessed by means of a bus 35. The module 22 comprises one or more processors 44, 45, 46, 47 and a storage unit 27 accessed by means of a bus 36. The module 23 comprises one or more processors 50, 51, 52, 53 and a storage unit 28 accessed by means of a bus 37.

A table 54 of the same type as the table 4 is allocated to the group of processors 30 through 33. A table 55 of the same type as the table 5 is attributed to the group of processors 40 through 43. A table 56 of the same type as the table 6 is allocated to the group of processors 44 through 47. A table 57 of the same type as the table 7 is allocated to the group of processors 50 through 53.

A table 58 of the same type as the table 1 is shared by all of the groups of processors. The table 58 resides, for example, in the storage unit 25 of the module 20. The residence of the table 54 in the storage unit 25 prevents any ill-timed occupation of the connection 29 during the active standby of a processor 30, 31, 32, 33 for a resource. The residence of the tables 55, 56, 57, respectively, in the storage units 26, 27, 28, produces the same effect. The data values in the table 54 may or may not be customized for each processor 30, 31, 32, 33. Different strategies for transferring a resource in step 17 are possible, in order to maintain control of the resource in the same module until it has been released by all the processors of the module that requested it, or conversely to allow a transfer to a processor of another module after a processor of a first module has obtained the resource. One skilled in the art will choose according to his own optimization criteria. The table 58 can also be distributed in the storage units 25 through 27 as a function of the location of the resources.

A distributed environment is an environment in which several machines exchange accessibility to their resources by means of communication messages. The machines may be single or multiprocessor machines. By allocating one or more data tables of the same type as the table 4 to each machine for the resources of all the machines and a distributed or localized table of counters of the same type as table 1 to all the machines, ill-timed exchanges between machines on active standby for a resource are prevented.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. Lock architecture having a first lock state and a second lock state for the allocation of shared resources of a computer systems the first lock state corresponding to a null value, the second lock state corresponding to a non-null value, said computer system comprising several processors (10, 11, 12, 13) arranged such that each processor (10) requesting a resource of the system takes control of said resource if the first lock state indicates that said resource is free and is placed on active standby if a second lock state indicates that said resource is busy, characterized in that a lock is associated with a data structure that comprises:

a counter that indicates a number of processors (10, 11, 12, 13) that have requested said resource without having used it and then released it, a first data item specific to a first processor (10), switched from a first value to a second value by said first processor (10) detecting the second lock state;

at least one second data item specific to a second processor (11, 12, 13) switched from a first value to a second value by said second processor (11, 12, 13) detecting the second lock state;

so that the second value of the first data item places said first processor (10) on active standby until the first data item is set to the first value by said second processor (11, 12, 13) releasing said resource, so that said first processor (10) having used said resource, sets the second data item to the first value if said first processor detects that the second lock state exists after the release of said resource.

2. Architecture according to claim 1, characterized in that it comprises:

a first table (4) for containing said first data item in a row wherein a row number corresponds to said resource, and at least one second table (5, 6, 7) for containing said second data item in a row wherein a row number is identical to that of the first table (4) corresponding to said resource, a counter table (1) for containing said counter in a row wherein a row number is identical to the row number of the first table (4) and the at least one second table (5, 6, 7) corresponding to said resource.

3. Architecture according to claim 2, characterized in that each resource in question of a set of resources of the computer system corresponds to a lock with which is associated a row number for containing at said other row number:

in the counter table (1), a counter of the number of processors (10, 11, 12, 13) having requested the resource in question, wherein a predetermined value indicates a first lock state;

in each table (4, 5, 6, 7) specific to one of the respective processors (10, 11, 12, 13), a data item that can be set to said second value by the respective processor that does not detect the predetermined value when it requests the resource in question, and can be set to said second value by any processor that decides to do so by releasing the resource in question.

4. A process executed by each processor in question (10) among for the allocation of shared resources in a computer system having several processors (10, 11, 12, 13) for requesting a resource in the computer system, said process being executed by each processor, the computer system comprising an atomic operation (2) for reading and modifying a lock that controls the use of said resource, characterized in that:

the atomic operation (2) consists of incrementing a counter wherein a predetermined value defines a first state of the lock;

the atomic operation (2) is followed by a first test (3) for triggering a first step (8) if the counter does not have a predetermined value at the start of the atomic operation (2) and for triggering a second step (14) for taking control of the resource if the counter has a predetermined value at the start of the atomic operation (2);

the first step (8) setting a data item specific to a first processor (10) in question to a second value such that the first processor (10) in question loops to a reading of its specific data item until the detection of a first value of its specific data item, which triggers the step for taking control of the resource (14);

the second step (14) being followed by a second test (16) after the release of the resource, for triggering a third step (17) if a decrementation of the counter does not result in the predetermined value and for triggering a fourth step (18) in the opposite case;

the third step (17) determining a second processor (11, 12, 13) distinct from the first processor (10) in question, wherein a specific data item is set to the second value, setting the specific data item of the determined second processor (11, 12, 13) to the first value, and triggering the fourth step (18);

the fourth step (18) comprising a second atomic operation for decrementing the counter.

5. Process according to claim 4, characterized in that each lock that controls the use of a distinct resource is associated with a row number in a data structure distributed in an addressable storage in the form of a counter table (1) and processor tables (4, 5, 6, 7), each specific to a processor (10, 11, 12, 13) so that:

for the first atomic operation (2), the first processor (10) connects to a first address that is a function of a start address of the table (1) and of the row number associated with the lock in question;

for the first step (8), the first processor (10) connects to a second address that is a function of a start address of the table (4) that is specific to the address and of the row number associated with the lock in question;

for the second test (16), the first processor (10) connects to the first address;

to determine in the third step (17) whether the data item specific to a second processor (11, 12, 13) is set to its second value, the first processor (10) connects to a third address that is a function of a start address of the table (5, 6, 7) specific to said second processor (11, 12, 13) and of the row number associated with the lock in question.

6. Process according to claim 4, characterized in that in order to determine, in the third step (17), a second processor (11, 12, 13) distinct from the first processor (10), the first processor (10):

calculates an address that is the sum of the row number associated with the lock in question, and the start address of the table (5) specific to the next second processor (11);

if the data item read at the address calculated is set to the second value, the next second processor (11) is the determined processor;

if not, the first processor (10) calculates an address that is the sum of the row number associated with the lock in question and the start address of the table (6) specific to the next further processor (12), and so on with the start address of the table (7) specific to the next still further processor (13) until it reads at the address calculated a data item set to the second value, which determines the distinct processor to which this data item is specific.

7. Process according to claim 4, characterized in that in order to determine, in the third step (17), a second processor (11, 12, 13) distinct from the first processor (10), the first processor (10):

calculates an address that is the sum of the row number associated with the lock in question and the start address of the table (5, 7, 8) specific to each respective distinct second processor (11, 12, 13);

determines the distinct second processor to be the one whose specific data item read at the address calculated is set to the lowest non-null value among the values of the data items specific to the distinct second processors, read at each calculated address.

8. Process according to claim 5, characterized in that in order to determine, in the third step (17), a second processor (11, 12, 13) distinct from the first processor (10), the first processor (10):

calculates an address that is the sum of the row number associated with the lock in question, and the start address of the table (5) specific to the next second processor (11);

if the data item read at the address calculated is set to the second value, the next second processor (11) is the determined processor;

if not, the first processor (10) calculates an address that is the sum of the row number associated with the lock in question and the start address of the table (6) specific to the next further processor (12), and so on with the start address of the table (7) specific to the next still further processor (13) until it reads at the address calculated a data item set to the second value, which determines the distinct processor to which this data item is specific.

9. Process according to claim 5, characterized in that in order to determine, in the third step (17), a second processor (11, 12, 13) distinct from the first processor (10), the first processor (10):

calculates an address that is the sum of the row number associated with the lock in question and the start address of the table (5, 7, 8) specific to each respective distinct second processor (11, 12, 13);

determines the distinct second processor to be the one whose specific data item read at the address calculated is set to the lowest non-null value among the values of the data items specific to the distinct second processors, read at each calculated address.

* * * * *

UNITED STATES PATENT AND TRADEMARK OFFICE
CERTIFICATE OF CORRECTION

PATENT NO.   : 6,477,597 B1
DATED        : November 5, 2002
INVENTOR(S)  : Sorace et al.

It is certified that error appears in the above-identified patent and that said Letters Patent is hereby corrected as shown below:

Column 7,
Line 40, delete "systems" and substitute with -- system --;

Column 8,
Lines 31-32, delete "executed by each processor in question (10) among";

Signed and Sealed this

Twenty-ninth Day of April, 2003

JAMES E. ROGAN
*Director of the United States Patent and Trademark Office*